(12) United States Patent
Lin et al.

(10) Patent No.: US 11,171,762 B2
(45) Date of Patent: *Nov. 9, 2021

(54) WIRELESS DEVICE ARCHITECTURE TO SUPPORT VERY-HIGH-RELIABILITY (VHR) COMMUNICATION

(71) Applicant: QUALCOMM Incorporated, San Diego, CA (US)

(72) Inventors: Jamie Menjay Lin, San Diego, CA (US); Jing Jiang, San Diego, CA (US); Tingfang Ji, San Diego, CA (US); Kambiz Azarian Yazdi, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,834

(22) Filed: Mar. 11, 2019

(65) Prior Publication Data

US 2019/0268129 A1 Aug. 29, 2019

Related U.S. Application Data

(63) Continuation of application No. 15/081,773, filed on Mar. 25, 2016, now Pat. No. 10,263,754.

(Continued)

(51) Int. Cl.
*H04L 5/02* (2006.01)
*H04L 1/00* (2006.01)
*H04L 1/04* (2006.01)

(52) U.S. Cl.
CPC ........... *H04L 5/023* (2013.01); *H04L 1/00* (2013.01); *H04L 1/0041* (2013.01); *H04L 1/04* (2013.01)

(58) Field of Classification Search
CPC ....... H04L 1/0041; H04L 1/0061; H04L 1/04; H04L 1/004; H04L 5/023; H04B 17/38; H04W 24/02

See application file for complete search history.

(56) References Cited

U.S. PATENT DOCUMENTS

| 7,457,295 | B2* | 11/2008 | Saunders | ............... H04B 1/715 370/322 |
| 2006/0092873 | A1* | 5/2006 | Khayrallah | ........... H04L 1/0001 370/329 |

(Continued)

FOREIGN PATENT DOCUMENTS

| CN | 101594205 A | 12/2009 |
| CN | 101801097 A | 8/2010 |

(Continued)

OTHER PUBLICATIONS

Chung F-H., et al., "Design of Carrier-Aggregated Modulator for LTE Advanced", 2014, IEEE, pp. 1-3.

(Continued)

*Primary Examiner* — Shelly A Chase
(74) *Attorney, Agent, or Firm* — Qualcomm Incorporated

(57) ABSTRACT

The disclosure provides for an apparatus for wireless communications using carrier aggregation comprised of multiple carrier components. The apparatus can include a processor configured to generate one or more instances of a codeword from a data payload. In an aspect, the apparatus also includes a modulator configured to modulate the one or more instances of the codeword onto the multiple carrier components for transmission. In an aspect, the apparatus also includes a resource manager configured to provide the processor with a virtual carrier space comprising a logical carrier having a contiguous bandwidth equivalent to the aggregated bandwidth of the multiple carrier components. In an aspect, the process may be further configured to inter- (Continued)

leave at least one of the codeword instances across the multiple carrier components. In an aspect, the modulator may be configured to modulate the codeword instance onto the multiple carrier components in accordance to the interleaving.

18 Claims, 6 Drawing Sheets

Related U.S. Application Data

(60) Provisional application No. 62/221,534, filed on Sep. 21, 2015.

(56) References Cited

U.S. PATENT DOCUMENTS

| | | | | |
|---|---|---|---|---|
| 2007/0076784 | A1* | 4/2007 | Zhou | H04L 1/0041 |
| | | | | 375/141 |
| 2011/0235619 | A1 | 9/2011 | Chong et al. | |
| 2014/0369446 | A1 | 12/2014 | Kwon et al. | |
| 2015/0043336 | A1* | 2/2015 | Zhu | H04W 28/0268 |
| | | | | 370/230 |
| 2015/0098412 | A1 | 4/2015 | Yerramalli et al. | |
| 2015/0271755 | A1* | 9/2015 | Karri | H04W 28/0221 |
| | | | | 370/252 |
| 2016/0072656 | A1* | 3/2016 | Nilsson | H04L 27/2647 |
| | | | | 375/316 |
| 2016/0295561 | A1 | 10/2016 | Papasakellariou | |
| 2017/0085356 | A1 | 3/2017 | Lin et al. | |

FOREIGN PATENT DOCUMENTS

| | | |
|---|---|---|
| CN | 101911536 A | 12/2010 |
| CN | 102356564 A | 2/2012 |
| CN | 103297105 A | 9/2013 |
| WO | 2009082160 A1 | 7/2009 |
| WO | 2013070189 A1 | 5/2013 |

OTHER PUBLICATIONS

International Preliminary Report on Patentability—PCT/US2016/052218, The International Bureau of WIPO—Geneva, Switzerland, dated Jan. 11, 2018.
International Search Report and Written Opinion—PCT/US2016/052218—ISA/EPO—dated Dec. 6, 2016.
Nguyen., et al., "Multi-user MIMO and carrier aggregation in 4G systems: the SAMURAI approach," 2012, IEEE, pp. 288 to 293.

* cited by examiner

WIRELESS DEVICE ARCHITECTURE TO SUPPORT VERY-HIGH-RELIABILITY (VHR) COMMUNICATION

RELATED APPLICATIONS

This Application is a continuation of U.S. patent application Ser. No. 15/081,773, filed on Mar. 25, 2016, entitled "WIRELESS DEVICE ARCHITECTURE TO SUPPORT VERY-HIGH-RELIABILITY (VHR) COMMUNICATION," which claims the benefit of U.S. Provisional Application No. 62/221,534, filed on Sep. 21, 2015, entitled "WIRELESS DEVICE ARCHITECTURE TO SUPPORT VERY-HIGH-RELIABILITY (VHR) COMMUNICATION," each of which is assigned to the assignee hereof and is expressly incorporated by reference in its entirety.

FIELD

The present disclosure relates generally to telecommunications, and specifically to communications by a wireless device in a communications network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

Existing wireless devices use multiple antennas, modems, and processors to enable the device to communicate with other devices using higher bandwidths. Improvements in wireless design require improvements both in reliability of data being transmitted and latency of end-to-end transmission. Based on these issues, there exists a need for improvement of wireless devices to reliably use available resources to increase speed of data transmissions. Preferably, a solution would increase data speeds without adding a new level of complexity in communications control or error correction.

SUMMARY

One aspect of an apparatus for wireless communications using carrier aggregation comprising multiple carrier components is disclosed. The apparatus may include a processor configured to generate one or more instances of a codeword from a payload. The apparatus may also include a modulator configured to modulate the one or more instances of the codeword onto the multiple carrier components for transmission. In an aspect, the apparatus may also include a resource manager configured to provide the processor with virtual carrier space comprising a logical carrier having a contiguous bandwidth equivalent to the aggregated bandwidth of the multiple carrier components. In an aspect, the processor may be further configured to interleave at least one of the instances of the codeword across the multiple component carriers. In an aspect, the modulator may be further configured to modulate at least one instance of the codeword onto the multiple carrier components in accordance with the interleaving by the processor.

One aspect of an apparatus for wireless communications using carrier aggregation comprising multiple carrier components is disclosed. The apparatus may include a processor configured to generate one or more instances of a codeword from a payload. The apparatus may also include a resource manager configured to provide the processor with virtual carrier space comprising a logical carrier having a contiguous bandwidth equivalent to the aggregated bandwidth of the multiple carrier components. In an aspect, the processor may be further configured to map the one or more instances of the codeword to the logical carrier. In an aspect, the apparatus may also include a modulator configured to modulate the one or more instances of the codeword onto the multiple carrier components in accordance with the mapping by the resource manager. In an aspect, the processor may be further configured to interleave at least one of the instances of the codeword across the multiple component carriers. In an aspect, the modulator may be further configured to modulate at least one instance of the codeword onto the multiple carrier components in accordance with the interleaving by the processor.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
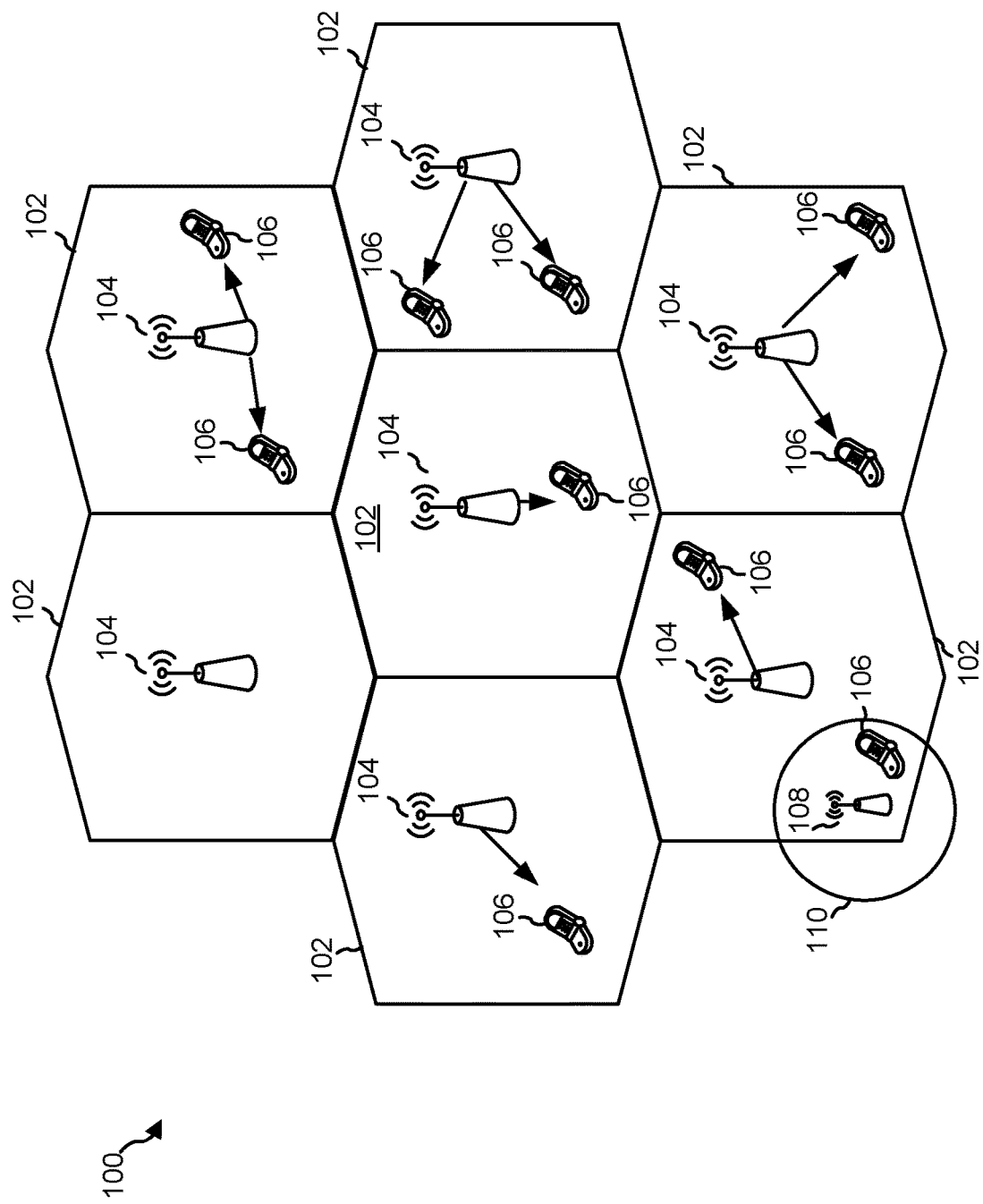
FIG. 1 is a conceptual diagram illustrating an exemplary embodiment of an access network.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well-known structures and components are shown in block diagram form in order to avoid obscuring the various concepts presented throughout this disclosure.

The word "exemplary" is used herein to mean serving as an example, instance, or illustration. Any embodiment described herein as "exemplary" or "illustrative" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

These concepts will now be presented with reference to various apparatus and methods. These apparatus and methods will be described in the following detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "controller" that includes one or more processors. A processor may include a general-purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. Examples of processors include microcontrollers, RISC processors, ARM processors, systems on a chip (SOC), baseband processors, programmable logic devices (PLDs), gated logic, discrete hardware circuits, and other suitable hardware configured to perform the various functionality described throughout this disclosure. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the controller may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a controller may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

In an aspect, the disclosure provides for a wireless device architecture to support very-high-reliability (VHR) communication. For instance, a transmitter device may employ a combination of multi-link signaling, cross-carrier interleaving, and virtualization of resource blocks and/or resource element groups (RB/REG) to enable implementations of wireless transmission methods, such as carrier aggregation (CA), using greater speed and reliability. In an aspect, a transmitter may receive a data payload of bits and may use a processing system to generate multiple codewords of the data payload and may interleave the codewords across multiple carrier components. Cross-carrier interleaving refers to a process by which instances of a codeword may be distributed across multiple carrier components, and transmitted via the multiple carrier components for improving signal reliability and diversity. As an example of this technique, a transmitter may use a resource manager to provide a virtual carrier space equivalent to multiple carrier components used by the transmitter. A resource manager may be configured to modulate the codewords onto the virtual carrier space and/or the multiple carrier components such that the transmitter can send the codewords using multiple carrier components. The architecture for the transmitter enables use of wide-band resources with higher diversity, which improves signal reliability to the receiver. More detailed illustrations of cross-carrier interleaving are provided with reference to FIGS. 4-6, below. In an aspect, the receiver can determine the signaling, encoding, interleaving, and or carrier mode techniques used by the transmitter and may decode the received codewords to extract the original data payloads.

FIG. 1 is a conceptual diagram illustrating an exemplary embodiment of an access network 100 in a wireless network architecture. For example, access network 100 may be a network based on 4G LTE standards or based on 5G standards that require, for example, higher reliability, security, speed, and/or lower latency in communication between devices (e.g., below 1 ms end-to-end latency, 1-10 Gbps connection from user equipment to endpoint).

In illustrative embodiment, access network 100 is divided into a number of cellular regions (cells) 102. One or more lower-power class eNode Bs (eNBs) 108 can have cellular regions 110 that overlap with one or more of cells 102. Lower-power class eNB 108 may be a femto cell (e.g., home eNB or HeNB), pico cell, micro cell, or remote radio head (RRH). Macro eNBs 104 are each assigned to a respective cell 102 and are configured to provide an access point to an evolved packet core (EPC) for all wireless devices 106 in cells 102. There is no centralized controller in this example of an access network 100, but a centralized controller may be used in alternative configurations. The eNBs 104 are responsible for all radio-related functions including radio bearer control, admission control, mobility control, scheduling, security, and connectivity to a serving gateway and/or radio network controller (RNC). An eNB can support one or multiple (e.g., three) cells (also referred to as a sector). The term "cell" can refer to the smallest coverage area of an eNB and/or an eNB subsystem serving are particular coverage area. Further, the terms "eNB," "base station," and "cell" can be used interchangeably herein.

The modulation and multiple access scheme employed by access network 100 can vary, depending on the particular telecommunications standard being deployed. In LTE applications, orthogonal frequency-division multiplexing (OFDM) is used on the DL and SC-FDMA is used on the UL to support both frequency-division duplex (FDD) and time-division duplex (TDD). As those skilled in the art will readily appreciate from the detailed description to follow, the various concepts presented herein are well-suited for LTE applications. However, these concepts may be readily extended to other telecommunication standards employing other modulation and multiple access techniques.

By way of example, these concepts may be extended to Evolution-Data Optimized (EV-DO) or Ultra-Mobile Broadband (UMB). EV-DO and UMB are air interface standards promulgated by the 3rd-Generation Partnership Project 2 (3GPP2) as part of the CDMA2000 family of standards and employs CDMA to provide broadband Internet access to mobile stations. These concepts can also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 502.11 (Wi-Fi), IEEE 502.16 (WiMAX), IEEE 502.20, and Flash-OFDM employing OFDMA. UTRA, E-UTRA, UMTS, LTE, 5G and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 104 can have multiple antennas supporting MIMO technology. The use of MIMO technology enables eNBs 104 to exploit the spatial domain to support spatial multiplexing, beamforming, and transmit diversity. Spatial multiplexing can be used to transmit different streams of data simultaneously on the same frequency. The data streams can be transmitted to a single wireless device 106 to increase the data rate or to multiple wireless devices 106 to increase the overall system capacity. This is achieved by spatially precoding each data stream (i.e., applying a scaling of an amplitude and a phase) and then transmitting each spatially-precoded stream through multiple transmit antennas on the DL. The spatially-precoded data streams arrive at wireless device(s) 106 with different spatial signatures, which enables each of wireless device(s) 106 to recover the one or more data streams destined for that wireless device 106. On the UL, each wireless device 106 transmits a spatially-precoded data stream, which enables eNB 104 to identify the source of each spatially-precoded data stream.

Spatial multiplexing is generally used when channel conditions are good. When channel conditions are less favorable, beamforming may be used to focus the transmission energy in one or more directions. This can be achieved by spatially precoding the data for transmission through multiple antennas. To achieve good coverage at the edges of the cell, a single stream beamforming transmission can be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) can be added to each OFDM symbol to combat inter-OFDM-symbol interference. The UL can use SC-FDMA in the form of a DFT-spread OFDM signal to compensate for high peak-to-average power ratio (PAPR).

FIG. 2A is diagram illustrating an exemplary embodiment of a continuous carrier aggregation (CA) type communications channel. FIG. 2B is a diagram illustrating an exemplary embodiment of a non-continuous CA-type communications channel.

Wireless devices (e.g., wireless device 106 of FIG. 1) can use spectrum up to 20 MHz bandwidths allocated in a carrier aggregation (CA) of up to a total of 100 MHz (using, e.g., 5 carrier components) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers.

Two types of carrier aggregation methods may be employed by wireless device 106 and/or eNB 104: continuous CA, as shown in diagram 200 (FIG. 2A), and non-continuous CA, as shown in diagram 250 (FIG. 2B). Non-continuous CA occurs when multiple available carrier components (CCs) are separated along the frequency band (FIG. 2B). Alternatively, continuous CA occurs when multiple available component carriers are adjacent to each other (FIG. 2A). Both non-continuous and continuous CA aggregate component carriers to serve a single wireless device. In an aspect, a wireless device like wireless device 106 may use multiple component carriers for concurrent transmission. In an aspect, wireless device 106 may be in a single-carrier mode when it employs only one of the component carriers.

In an aspect, multiple RF receiving units and multiple fast fourier transforms (FFTs) (which may be included in the RF front end of the wireless device) can be deployed with non-continuous CA, as the component carriers are separated along the frequency band. As non-continuous CA supports data transmissions over multiple, separated component carriers across a large frequency range, propagation path loss, Doppler shift, and other radio-channel characteristics can vary largely at different frequency bands. Thus, to support broadband data transmission under the non-continuous CA approach, methods can be used to adaptively adjust coding, modulation, and transmission power for different component carriers. For example, where the eNB has fixed transmitting power on each component carrier, the effective coverage or supportable modulation and coding of each component carrier can be different.

Figure 3:
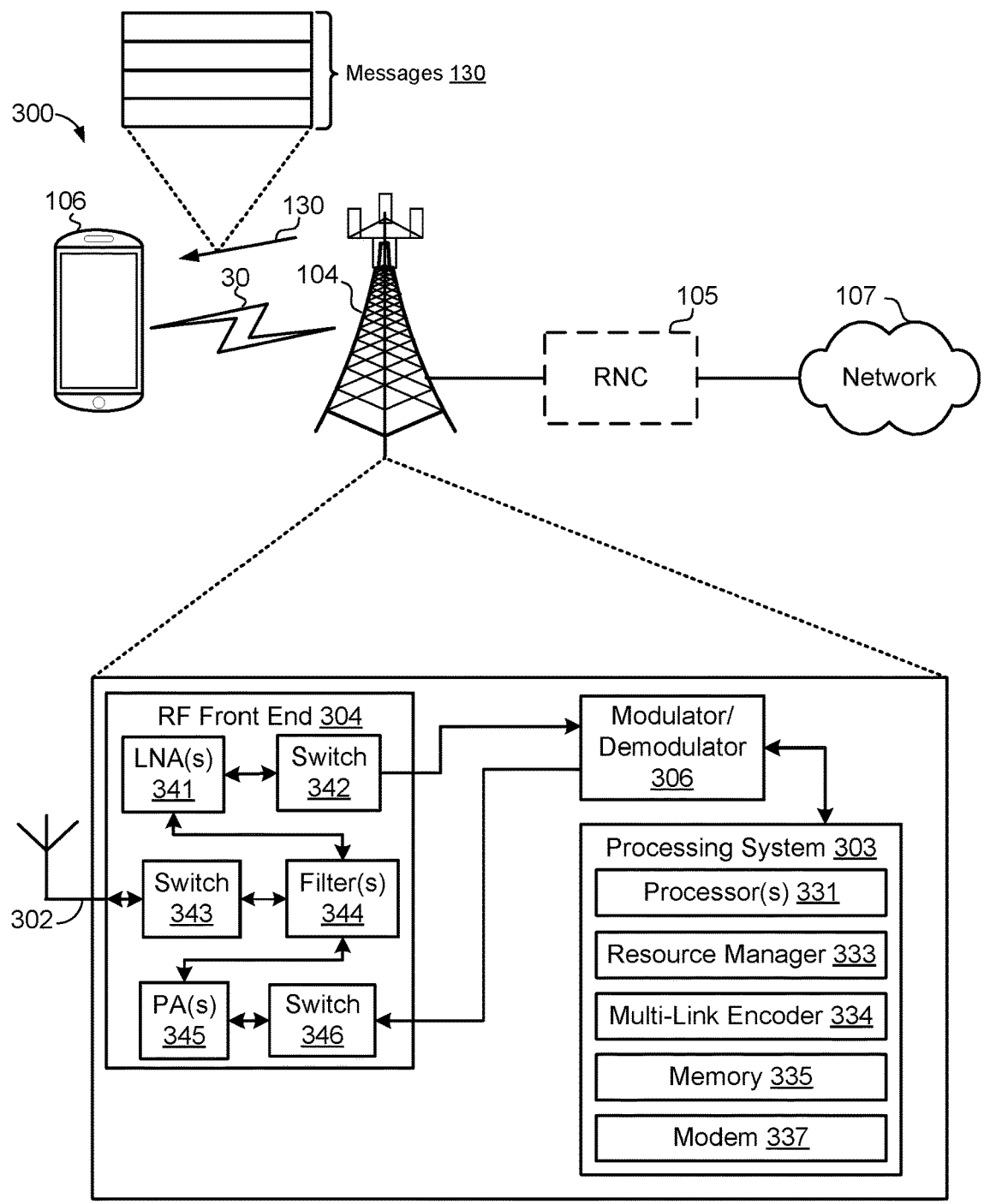
FIG. 3 is a block diagram illustrating an example communications network including a base station in communication with a user equipment (UE) and including one or more components for implementing very-high-reliability (VHR) communication between the base station and the UE.

FIG. 3 is a block diagram illustrating an exemplary communications network including a base station in communication with a user equipment (UE) and including one or more components for implementing very-high-reliability (VHR) communication between the base station and the UE. Wireless communication system 300 includes at least one UE 106 in communication coverage of at least one network entity 104 (e.g., a base station or an eNB). For example, UE 106 can communicate with a network 107 via network entity 104 and optionally a radio network controller (RNC) 105 (such as when network entity 104 is an eNB).

In an aspect, UE 106 may be a wireless device that may receive one or more messages 130 from network entity 104. In an aspect, when UE 106 receives multiple messages 130 from network entity 104, UE 106 may receive the multiple messages 130 concurrently over multiple component carriers used by network entity 104.

In some aspects, UE 106 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. UE 106 may be a cellular phone, a smartphone, a tablet computer, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things (IoT), or any other similar-functioning device.

The wireless communications 30 between the UE 106 and the network entity 104 may include signals transmitted by either the network entity 104 or the UE 106. Wireless communications 30 can include downlink channels transmitted by network entity 104. For example, network entity 104 may transmit on a high-speed downlink shared channel (HS-DSCH), high-speed physical downlink shared channel (HS-PDSCH), downlink dedicated physical control channel (DL-DPCCH), or a fractional dedicated physical channel (F-DPCH). In another aspect, wireless communications 30 can include uplink channels transmitted by UE 106. For example, UE 106 may transmit on a high-speed uplink shared channel (HS-USCH), high-speed physical uplink shared channel (HS-PUSCH), uplink dedicated physical control channel (UL-DPCCH), or a physical random access channel (PRACH).

Figure 2:
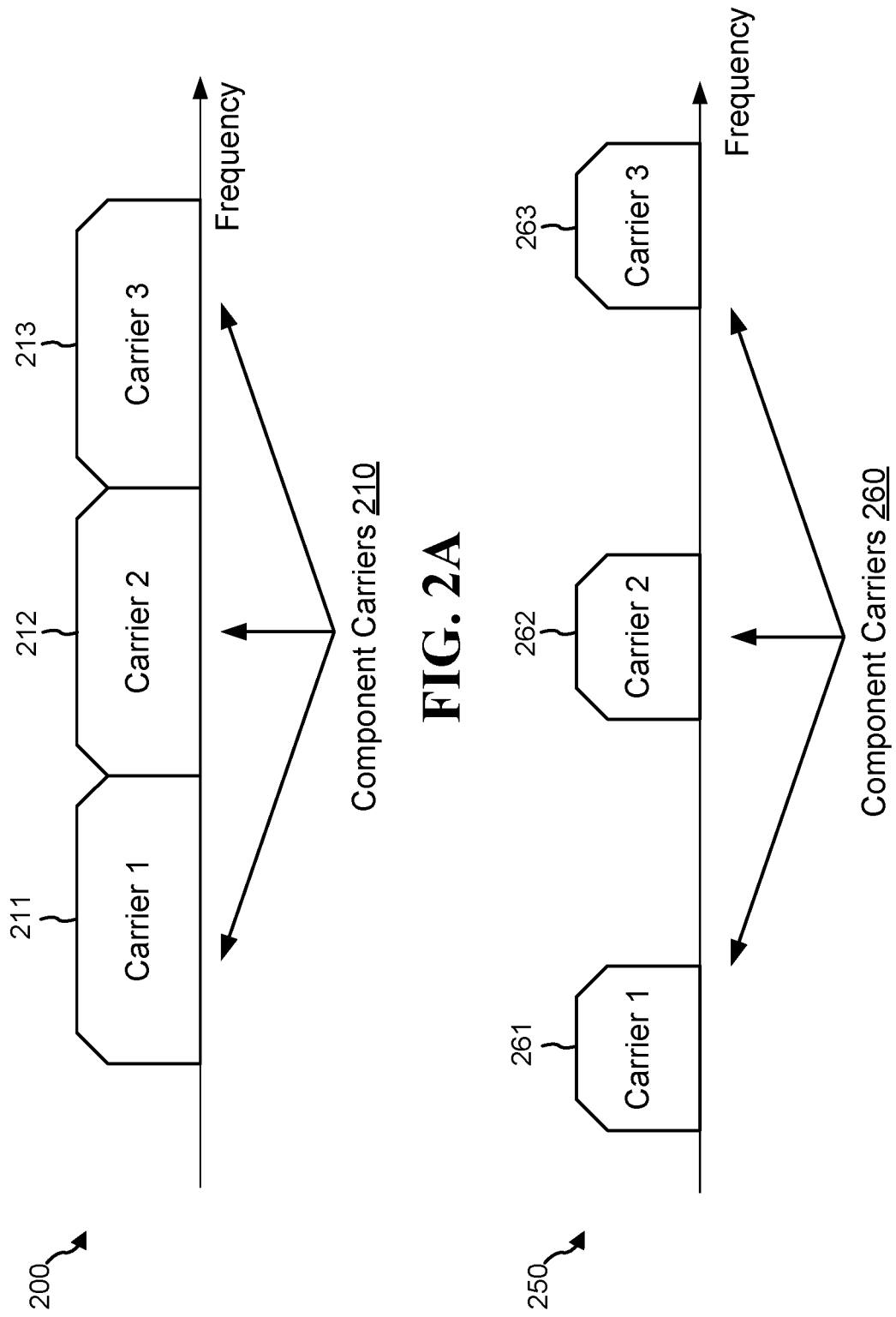
FIG. 2A is diagram illustrating an exemplary embodiment of a continuous carrier aggregation (CA) type communications channel.
FIG. 2B is a diagram illustrating an exemplary embodiment of a non-continuous CA-type communications channel.

In an aspect, network entity 104 may be a base station such as a Node B in a UMTS wireless network or an eNodeB in an LTE or 5G-based wireless network. In some aspects, multiple UEs including UE 106 may be in communication coverage with one or more network entities, including network entity 104. In an example, UE 106 may transmit and/or receive wireless communications 30 to and/or from network entity 104. In an aspect, network entity 104 may include a processing system 303 that may use resource manager 333 to send messages 130 to UE 106 using multiple carrier components over multiple carriers, e.g., carriers 211-213, 261-263 (FIG. 2). In other words, resource manager 333 may operate to encode, modulate, and send a data payload using multiple messages 130. In another aspect, network entity 104 may use processing system 303 and optionally, a resource manager 333 to receive multiple messages from UE 106 via multiple carrier components and combine and decode the messages to retrieve the data payload included in the messages.

In an aspect, as will be discussed in further detail below, network entity 104 may send messages 130 via concurrent transmissions to UE 106. In an aspect, network entity 104 may employ resource manager 333 to generate multiple codewords from a data payload. In an aspect, network entity 104 may employ resource manager 333 to interleave a codeword across the multiple carrier components used by network entity 104. Network entity 104 may multiplex the codeword onto the multiple carrier components and transmit messages 130 concurrently over the associated multiple carriers to UE 106. In another aspect, network entity 104 may receive, via antenna(s) 302 and RF front end 304, multiple messages concurrently received from UE 106 and may use demodulator 306 and/or processing system 303 to combine and decode the messages to retrieve the data payload included in the messages.

In some aspects, network entity 104 may be referred to by those skilled in the art (as well as interchangeably herein) as a macrocell, picocell, femtocell, relay, Node B, mobile Node B, e Node B, UE (e.g., communicating in peer-to-peer or ad-hoc mode with UE 106), or substantially any type of component that can communicate with UE 106 to provide wireless network access at UE 106. Network entity 104 may include one or more antennas 302, an RF front end 304, a modulator/demodulator 306, and a processing system 303.

In an aspect, processing system 303 can include one or more processors 331, resource manager 333, multi-link encoder 334, memory 335, and modem 337. In an aspect, computer-executable code for resource manager 333 and/or multi-link encoder 334 may be included in memory 335, while the various functions related to resource manager 333 and/or multi-link encoder 334 may be included in modem 337 and/or processors 331. In an aspect, a single processor can execute the functions of resource manager 333 and/or multi-link encoder 334, while in other aspects, different ones of the functions may be executed by a combination of two or more different processors. For example, the one or more processors 331 may include any one or any combination of a modem processor, a baseband processor, a digital signal processor, a transmit processor, an application-specific integrated circuit (ASIC), or a transceiver processor associated with modulator/demodulator 306. In particular, the one or more processors 331 may operate with memory 335 to execute operations and/or components included in or controlled by resource manager 333 and/or multi-link encoder 334.

In an aspect, as will be discussed in further detail, network entity 104 may use processing system 303 to execute one or more aspects of resource manager 333 and/or multi-link encoder 334 to perform one or more encoding techniques on a data payload such that the modulator 306 can send multiple messages concurrently using multiple carrier components. In an aspect, resource manager 333 may control one or more components of multi-link encoder 334 to produce multiple instances of a codeword for a data payload (e.g., "multi-codeword instantiation"). Additionally, in an aspect, resource manager 333 may also control one or more components of multi-link encoder 334 to interleave a produced codeword across multiple carrier components. Further, in an aspect, resource manager 333 may also control one or more aspects of multi-link encoder 334 to provide a virtual resource block representing the combination of the available carrier components as a single virtual carrier such that the produced codewords are mapped to different carrier components based on their location within the virtual resource block.

In an aspect, processing system 303 of network entity 104 may include memory 335 for storing data used herein (e.g., data payload, instances of codewords) and/or local versions of applications and/or resource manager 333 and multi-link encoder 334 and/or one or more of their subcomponents being executed by processor(s) 331. Memory 335 can include any type of computer-readable medium usable by a computer or processor 331, such as random-access memory (RAM), read-only memory (ROM), solid state memory, tapes, magnetic discs, optical discs, volatile memory, non-volatile memory, and any combination thereof.

In an aspect, for example, memory 335 may be a non-transitory computer-readable storage medium that stores one or more computer-executable codes defining resource manager 333 and/or multi-link encoder 334 and/or one or more of their subcomponents, and/or data associated therewith. In such instances, network entity 104 may operate processor 331 of processing system 303 to execute one or more functions of resource manager 333, multi-link encoder 334 and/or one or more of their subcomponents.

In an aspect, modem 337 can be a multiband-multimode modem, which can process digital data and communicate with modulator/demodulator 306 such that the digital data is sent and received using modulator/demodulator 306. In an aspect, modem 337 can be multiband and configured to support multiple frequency bands (e.g., multiple carrier components) for a specific communications protocol. In an aspect, modem 337 can be multimode and configured to support multiple operating networks and communications protocols. In an aspect, modem 337 can control one or more components of network entity 104 (e.g., RF front end 304, modulator/demodulator 306) to enable transmission and/or reception of signals with UE 106 based on a specified modem configuration. In an aspect, the modem configuration can be based on the mode of modem 337 and the frequency band(s) in use.

Moreover, in an aspect, network entity 104 may include RF front end 304 and modulator/demodulator 306 for receiving and transmitting radio transmissions, such as, for example, wireless communications 30. In an aspect, modulator/demodulator 306 may be configured to modulate messages provided to it by processing system 303 for transmission to UE 106 via RF front end 304 and antenna(s) 302. In an aspect, modulator/demodulator 306 may be configured to demodulate messages received from UE 106 via antenna(s) 302 and RF front end 304 and send the messages to processing system 303. In an aspect, modulator/demodulator 306 may include a transceiver that includes a transmitter configured to transmit wireless signals and a receiver configured to receive wireless signals through antenna(s) 302 via RF front end 304. In an aspect, the transceiver of modulator/demodulator 306 may be tuned to operate at specified frequencies such that network entity 104 can communicate with, for example, UE 106. In an aspect, for example, modem 337 can configure the transceiver of modulator/demodulator 306 to operate at specified frequencies and power levels based on the network configuration of network entity 104 and communication protocol(s) used by modem 337.

RF front end 304 may be connected to one or more antennas 302 and can include one or more low-noise amplifiers (LNAs) 341, one or more switches 342, 343, 346, one or more power amplifiers (PAs) 345, and one or more filters 344 for transmitting and receiving RF signals via wireless communications 30. In an aspect, components of RF front end 304 can connect with modulator/demodulator 306. Modulator/demodulator 306 may connect to one or more modems 337 and processor(s) 331 within processing system 303. LNA 341 can amplify a received signal at a desired output level. Each LNA 341 may have a specified minimum and maximum gain values. In an aspect, RF front end 304 may use one or more switches 342, 343 to select a particular LNA 341 and its specified gain value based on a desired gain value for a particular application.

Further, for example, one or more PA(s) 345 may be used by RF front end 304 to amplify a signal for an RF output at a desired output power level. In an aspect, each PA 345 may have a specified minimum and maximum gain values. RF front end 304 may use one or more switches 343, 346 to select a particular PA 345 and its specified gain value based on a desired gain value for a particular application. Also, for example, one or more filters 344 can be used by RF front end 304 to filter a received signal to obtain an input RF signal. Similarly, for example, a respective filter 344 can be used to filter an output from a respective PA 345 to produce an output signal for transmission. Each filter 344 can be connected to a specific LNA 341 and/or PA 345. RF front end 404 can use one or more switches 342, 343, 346 to select a transmit or receive path using a specified filter 344, LNA, 341, and/or PA 345, based on a configuration as specified by modulator/demodulator 306 and/or processing system 303.

Figure 4:
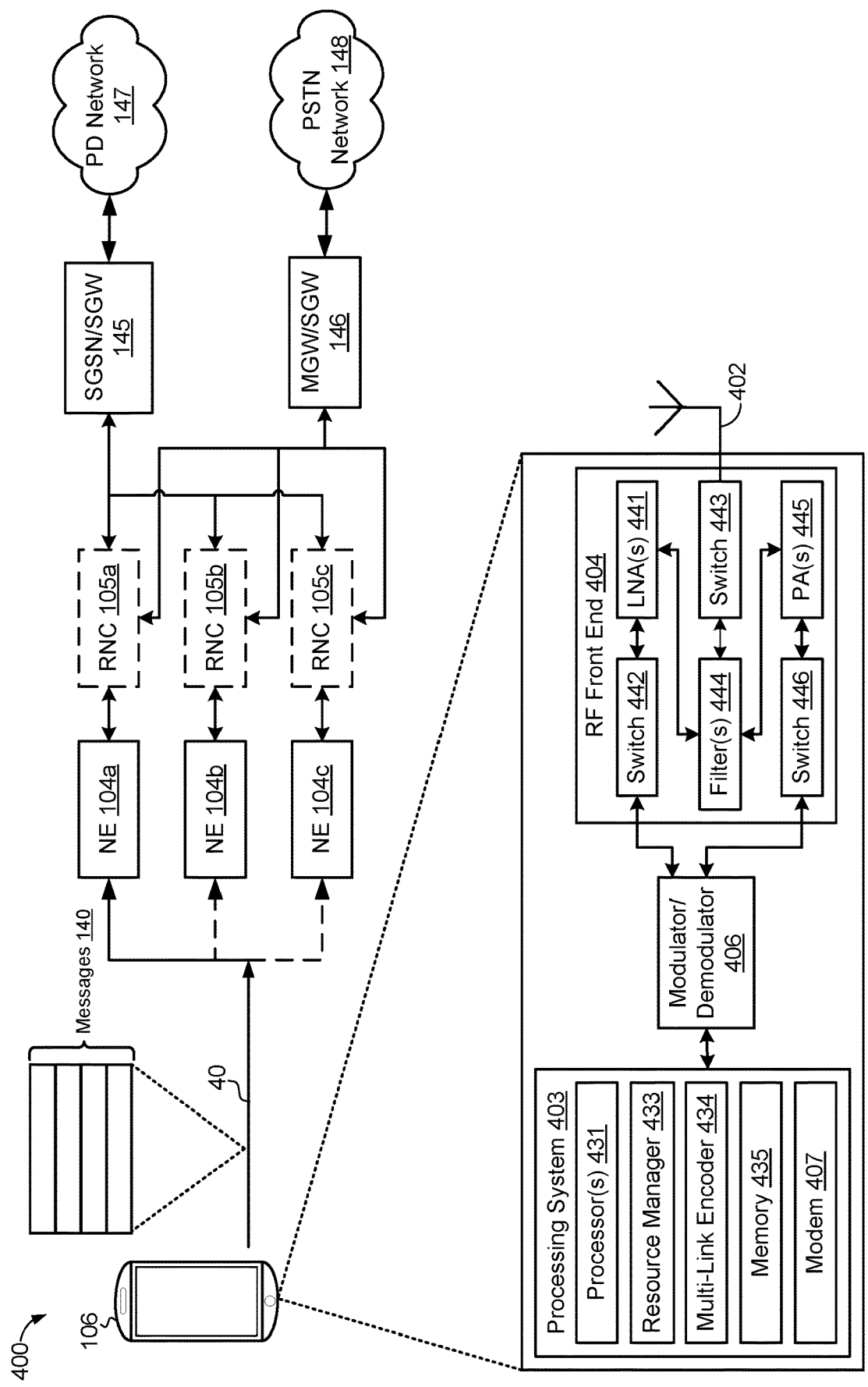
FIG. 4 is a block diagram illustrating an example communications network including a UE in communication with a base station and including one or more components for implementing VHR communication between the UE and the base station.

FIG. 4 is a block diagram illustrating an example communications network including a UE in communication with a base station and including one or more components for implementing VHR communication between the UE and the base station. Wireless communication system 400 is similar to wireless communication system 300 and also includes UE 106. Wireless communication system 400 may also include multiple network entities (NE) 104a-c, may optionally include multiple radio network controllers (RNCs) 105a-c, a packet data network (PDN) 147, a serving general packet radio service (GPRS) support node (SGSN)/serving gateway (SGW) 145, a media gateway (MGW)/SGW 146, and a public switched telephone network (PSTN) 148.

In an aspect, UE 106 may be configured to send messages 140 to one or more network entities 104a-c via multiple carrier components. In an aspect, a single base station (e.g., NE 104b) may receive all the messages 140 sent from UE 106. In such instances, NE 104b may be configured to combine and decode the messages 140 to retrieve the included data payload. Another UE may receive messages 140 via PDN 147 and/or PSTN 148 and may be configured to combine and decode the messages 140 to retrieve the included data payload.

In an aspect, network entities 104a-c may be similar to network entity 104 and may connect UE 106 to a wireless network. In an aspect, one or more of NEs 104a-c may be a Node B and may connect to a network 147, 148 via a radio network controller 105a-c and at least one of an SGSN 145 or a MGW 146. In an aspect, one or more of NEs 104a-c may be a e Node B and may connect directly with at least one of SGW 145, 146 to connect to a network 147, 148.

UE 106 may include components 402, 403, 404, 406 similar to components 302, 303, 304, 306 of network entity 104 in FIG. 3. UE 106 may similarly use processing system 403, specifically resource manager 433 and/or multi-link encoder 434 to perform one or more encoding techniques on a data payload such that the modulator 406 can send (via RF front end 404 and antenna(s) 402) multiple messages concurrently using multiple carrier components.

In an aspect, resource manager 433 may control one or more components of multi-link encoder 434 to produce multiple instances of a codeword for a data payload. Additionally, in an aspect, resource manager 433 may also control one or more components of multi-link encoder 434 to interleave a produced codeword across multiple carrier components. Further, resource manager 433 may also control one or more aspects of multi-link encoder 434 to provide a virtual resource block representing the combination of the available carrier components as a single virtual carrier such that the produced codewords are mapped to different carrier components based on their location within the virtual resource block.

Figure 5:
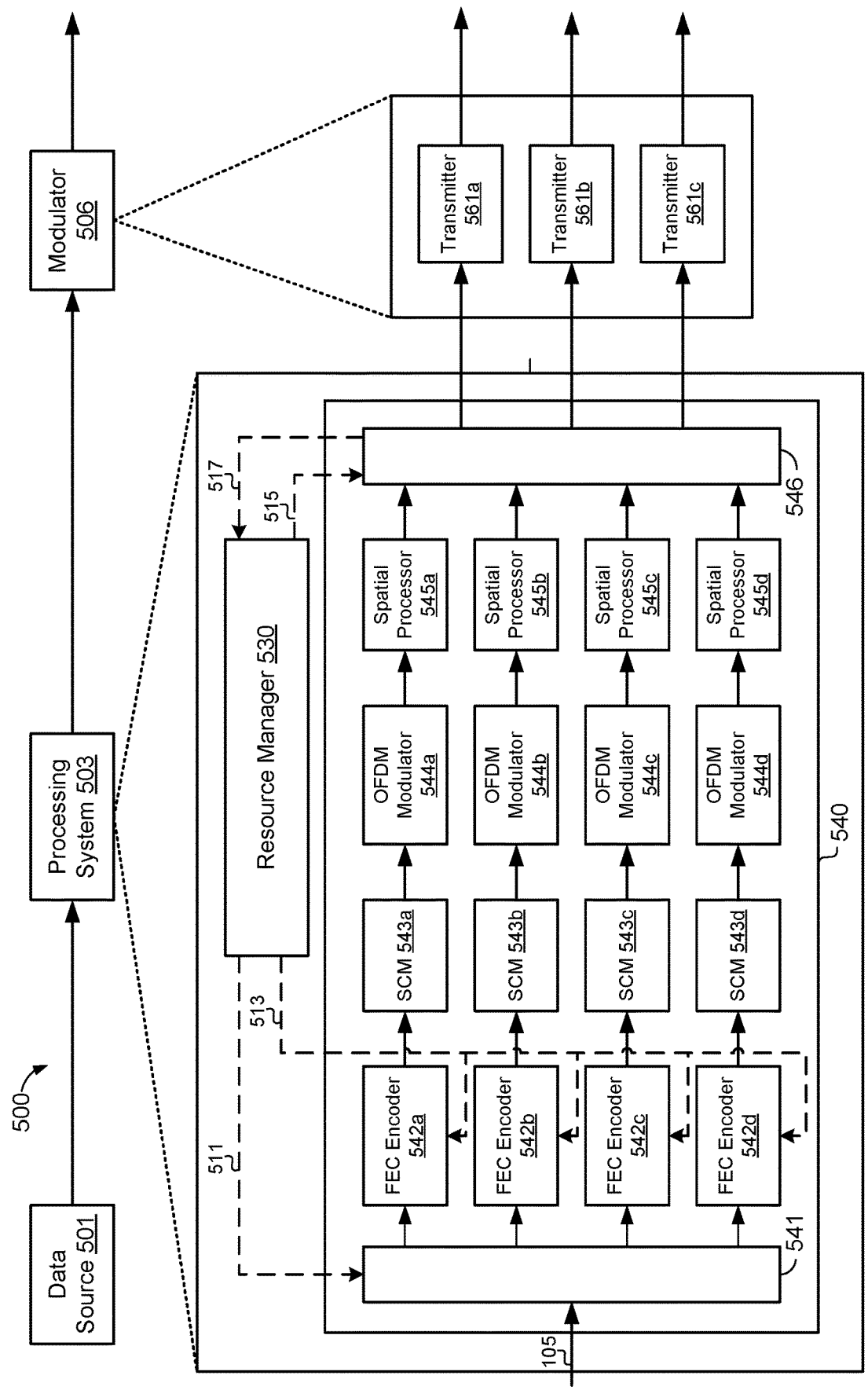
FIG. 5 is a block diagram illustrating an example transmitting wireless device, including a processing system for generating messages for transmission over multiple carrier components.

FIG. 5 is a block diagram illustrating an example transmitting wireless device, including a processing system for generating messages for transmission over multiple carrier components. Transmitter 500 illustrates components of a wireless device that transmit multiple messages using multiple carrier components. In an aspect, transmitter 500 may be network entity 104 sending downlink messages 130 to UE 106; in another aspect, transmitter 500 may be a UE sending uplink messages 140 to network entity 104.

Transmitter 500 may include a data source 501 that is sent via processing system 503 and modulator 506 to be transmitted via wireless communications 30. In an aspect, data source 501 may be a data payload that is stored in memory 335, 435 and sent to processing system 503, where it may be encoded in one or more codewords and sent as one or more messages 130, 140 via modulator 506.

Processing system 503 include resource manager 530 and multi-link encoder 540. Multi-link encoder 540 may receive data source 501, with one or more of its components being controlled by resource manager 530, and may produce one or more instances of a codeword that are transmitted via modulator 506.

Payload router 541 of multi-link encoder 540 may receive data source 501 as an input and may route a portion or the entire data payload of data source 501 to one or more of forward error correction (FEC) encoders 542a-d. In an aspect, payload router 541 may split the data payload into separate portions and route each portion to a separate FEC encoder 542a-d. In another aspect, payload router 541 may send copies of identical data payloads to one or more of FEC encoders 542a-d. Resource manager 530 may send a routing control signal 511 to payload router 541 to control the routing techniques employed by the payload router 541. In an aspect, the routing control signal 511 may be based on the multi-codeword instantiation technique being employed by FEC encoders 542a-d.

FEC encoders 542a-d may receive a data payload from payload router 541 and may perform signal processing functions to facilitate forward error correction by the receiving wireless device. For example, each of FEC encoders 542a-d may include coding to produce a codeword based on the input data payload and interleaving of the codeword. In an aspect, resource manager 530 can control the encoding and/or interleaving functions of FEC encoders 542a-d by sending an encoding control signal 513 to each of the FEC encoders; in an aspect, the encoding control signal 513 may comprise multiple encoding control signals, each being sent to a separate FEC encoder 542a-d and independently controlling the encoding and/or interleaving functions of each of the FEC encoders.

In an aspect, multi-link encoder 540 may employ one or more of FEC encoders 542a-d to produce the one or more codewords that are sent in multiple messages via multiple carrier components. For example, multi-link encoder 540 may employ a single FEC encoder 542 that generates a single codeword instance and interleaves the single codeword instance over multiple carrier components. In another example, multi-link encoder 540 may employ multiple FEC encoders 542a-d to encode an identical data payload to produce multiple codeword instances. FEC encoders 542a-d may then optionally interleave the multiple codeword instances over multiple carrier components. In an aspect, the codeword may be generated as a block code (e.g., when resource manager 530 sends a encoding control signal for FEC encoder 542a-d to perform a Reed-Solomon algorithm) or as a convolutional code (e.g., when resource manager 530 sends a encoding control signal for FEC encoder 542a-d. Where a Viterbi algorithm is implemented for encoding, the algorithm may be performed as part of the decoder function at the receiver (not shown). In an aspect, a block code can be generated by combining one or more convolutional codes with an interleaving algorithm.

In an aspect, FEC encoders 542a-d may employ one or more encoding and interleaving schemes on an input data payload. For example, FEC encoders 542a-d may perform one or more codeword instantiation schemes to produce multiple codewords from an input data payload. FEC encoders 542a-d may be in repetition version mode, where an FEC encoder 542a-d may generate repetitions of the same coded bits in multiple, identical codeword instances. In an aspect, FEC encoders 542a-d may be in redundancy version mode, wherein an FEC encoder 542a-d may generate different versions of coded bits in multiple codeword instances; this may result in different redundancy information for different codeword instances. In an aspect, any non-repetition version mode may be a type of the redundancy version mode.

In an aspect, FEC encoders 542a-d may switch between the repetition and redundancy version modes for the same input data payload. For example, an FEC encoder 542a-d may, under repetition version mode, generate multiple, identical versions of a codeword instance and then in redundancy version mode employ different encoding methods on each of the codeword instances to produce multiple versions of codewords from a single data payload. Similarly, an FEC encoder 542a-d may first in redundancy version mode generate multiple, differing codewords from a single data payload and then in repetition mode generate multiple, identical versions of each of the differing codewords generated in repetition mode.

In an aspect, FEC encoders 542*a-d* may also perform cross-carrier interleaving schemes on codewords generated from the input data payload. As will be discussed in further detail below in relation to carrier component buffer 546, resource manager 530 may determine and/or may know the address locations for each of the multiple carrier components. Resource manager 530 may then control FEC encoders 542*a-d* such that each codeword instance is interleaved across the multiple carriers. For example resource manager 530 may control FEC encoder 542*a-d* such that portions of a codeword instance are interleaved among the subcarrier frequency ranges (e.g., carriers 211-213, 261-263) used by transmitter 500. For example, FEC encoders 542*a-d* may receive an encoding control signal 513 to place a codeword instance into one or more interleaving frames. FEC encoder 542*a-d* may then map the interleaving block onto one or more frames that will be sent using different carrier components.

In an aspect, each signal constellation mapper (SCM) 543*a-d* may receive the codeword instances and/or interleaving frames from respective FEC encoders 542*a-d* and may map the input codeword or frame to signal constellations based on a modulation scheme. SCMs 543*a-d* may employ, for example, binary phase-shift keying (BPSK), quadrature phase-shift keying (QPSK), M-phase-shift keying (M-PSK), or M-quadrature amplitude modulation (M-QAM). In an aspect, SCMs 543*a-d* may split the coded and modulated symbols into parallel streams and may send the streams to OFDM modulators 544*a-d*.

Each Orthogonal Frequency-Division Multiplexing (OFDM) modulator 544*a-d* may receive a stream from respective SCMs 543*a-d* and may map the stream to an OFDM subcarrier, multiplex the stream with a reference signal (e.g., pilot) in the time and/or frequency domain, and then combine streams together using an Inverse Fast Fourier Transform (IFFT) to produce a physical channel carrying a time-domain OFDM symbol stream.

Each spatial processor 535*a-d* may receive an OFDM stream from respective OFDM modulators 544*a-d* and may spatially precode the OFDM stream to produce multiple spatial streams. In an aspect, channel estimates may be used to determine the modulation-and-coding scheme (CMS), as well as for spatial processing. The channel estimate may be derived from a reference signal and/or channel-condition feedback received by transmitter 500.

In an aspect, carrier component buffer 546 may receive the spatially-precoded OFDM streams and may provide them to a separate transmitter 561*a-c* in modulator 506. In an aspect, carrier component buffer 546 may include a logical carrier, such as a virtual carrier space represented by a virtual resource block (RB) or a virtual resource element group (REG) that represents the aggregated bandwidth of the multiple carrier components. In an aspect, the virtual RB represents the multiple carrier components as a single "virtual" or logical carrier with equivalent aggregated bandwidths. As will be discussed in further detail below, the spatially-precoded OFDM streams from spatial processors 545*a-d* may be mapped onto different portions of the virtual RB in carrier component buffer 546. In an aspect, carrier component buffer 546 may map different portions of the virtual RB to different carrier components. For example, for three carrier components, carrier component buffer 546 may split the virtual RB into at least three portions and provide three separate spatial streams, each stream being provided to a different transmitter 561*a-c* in modulator 506.

In an aspect, resource manager 530 may control carrier component buffer 546 via logical write signal 515. For example, resource manager 530 may send one or more logical write signals 515 to carrier component buffer 546 to modify the virtual RB. In an aspect, resource manager 530 can trigger multiple logical writes before the contents of the virtual RB are written into memory 335, 435. Resource manager 530 may determine the contents of carrier component buffer 546 via physical read 517 to retrieve the contents of the virtual RB. In such instances, resource manager 530 can determine, for example, which parts of the virtual RB are filled and which are free; resource manager 530 may also determine based on a physical read 517 which portions of the virtual RB to send to the one or more transmitters 561*a-c* in modulator 506.

Each transmitter 561*a-c* in modulator 506 may receive a spatial stream from carrier component buffer 546 and may modulate an RF carrier with a respective spatial stream for transmission. For example, each transmitter 561*a-c* may receive a spatial stream from processing system 503 via carrier component buffer 546 and may modulate a component carrier to transmit the stream. In an aspect, each of transmitters 561*a-c* may send the spatial stream concurrently using one of the carrier components used by transmitter 500.

In an aspect, a receiver may determine the modulation and/or encoding scheme used by transmitter 500. For example, the receiver may receive a message (e.g., a control message and/or a signaling message) that indicates encoding and transmission characteristics, such as whether transmitter 561 is using a single-carrier or multi-carrier mode, whether processing system 503 employed a repetition and/or redundancy mode in generating the codewords, and whether the processing system employed cross-carrier interleaving. In an aspect, the receiver may also infer the encoding and transmission characteristics based on the messages received. In an aspect, the receiver may use the encoding and transmission characteristics to combine the received messages and decode the codeword instances to retrieve the data payload.

Figure 6:
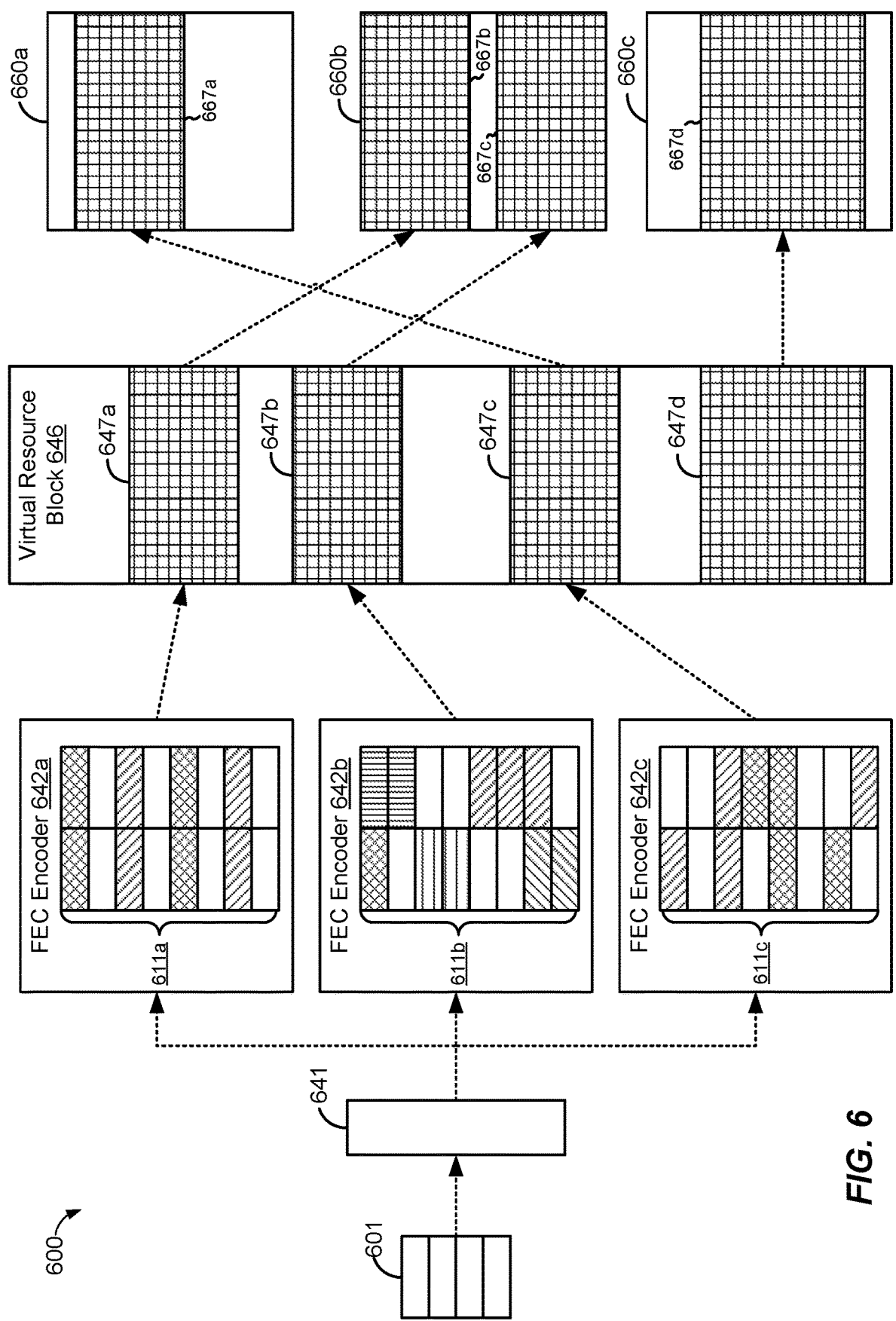
FIG. 6 is a conceptual diagram illustrating an example of a transmitting wireless device generating codewords for transmission over multiple carrier components.

FIG. 6 is a conceptual diagram illustrating an example of a transmitting wireless device generating codewords for transmission over multiple carrier components. Diagram 600 illustrates the encoding of a data payload 601 by, for example, processing system 503 of transmitter 500 and the allocation of the codeword instances 611*a-c* in virtual resource block (RB) 646 before being allocated to physical resource blocks associated with carrier components 660*a-c*.

Payload router 641 may be similar to payload router 541 of transmitter 500 and may receive a data payload 601. Payload router 641 may send copies of data payload 601 to each of FEC encoders 642*a-c*. In an aspect, FEC encoders 642*a-c* may be similar to FEC encoders 542*a-d* and may receive either identical copies of the same data payload 601 or different portions of data payload 601 from payload router 641.

In an aspect, each FEC encoder 642*a-c* may encode the incoming data payload 601 with a combination of repetition and/or redundancy techniques. For example, FEC encoder 642*a* may first encode data payload 601 in redundancy mode and then encode the resultant codeword in repetition mode to produce codeword instances 611*a*. FEC encoder 642*b* may similarly encode data payload 601 in only redundancy mode to produce codeword instances 611*b*. FEC encoder 642*c* may first encode data payload 601 in repetition mode and then encode the resultant codeword in repetition mode to produce codeword instances 611*c*. In an aspect, one or more of FEC encoders 642*a-c* may interleave the produced codewords 611*a-c* across multiple carrier components 660*a-c*. In an aspect, one or more of FEC encoders 642*a-c* may interleave the data payload across the multiple carrier components without encoding the data payload. In an aspect, each FEC encoder 642a-c may send (via SCM 543a-c, OFDM modulator 544a-c, and spatial processor 545a-c) codeword instances 611a-c to portions of virtual resource block (RB) 646 in carrier component buffer 546 of transmitter 500.

In an aspect, virtual RB 646 may have a virtual bandwidth (based on a series of resource block groups) equivalent to the aggregated bandwidths of all the combined carrier components 660a-c; for example, if each of three carrier components 660a-c had a bandwidth equal to one RBG, virtual RB 646 may have a bandwidth equal to three RBGs. In an aspect, virtual RB 646 may reduce overhead in resource representation, as virtual RB 646 allows a controlling component (e.g., resource manager 530) to use fewer bits to represent specific RB resources. For example, for resource allocation type 0, virtual RB 646 allows for a larger overall group size, and thus allows for larger resource block group sizes to be transmitted. Similarly, for resource allocation type 2, virtual RB 646 allows for fewer bits to represent allocations for all users.

In an aspect, codeword instances 611a-c can be written into virtual RB 646 contiguously. In another aspect, codeword instances 611a-c can be written into different, non-contiguous portions of virtual RB 646. For example, codeword instances 611a-c can be stored in non-contiguous virtual RB sections 647a-c of virtual RB 646. In an aspect, FEC encoders 642a-c can write codeword instances into multiple sections of virtual RB 646; for example, FEC encoder 642c—may write portions of codeword instance 611c into each of virtual RB sections 647a-d.

In an aspect, virtual RB 646 can also reserve and/or indicate specific resource spaces for specified purposes, such as for control search spaces and data allocations. For example, resource manager 530 of processing system 503 may enable multi-link signaling over multiple carrier components 660a-c using specified RB indications within the virtual RB 646 to for control signaling via carrier components 660a-c. In an aspect, for example, a portion of virtual RB 646 can be allocated as specific bits to be transmitted using a specified physical channel as allocated on the physical bandwidth of a component carrier.

In an aspect, resources of virtual RB 646 can be mirrored so that all resources within the same relative portion within each carrier component 660a-c. In an aspect, the mirrored RB allocation type may be reflected in the virtual RB 646, with specific RB sections 647a-d of virtual RB 646 being mapped by resource manager 530 to specified portions (e.g., one or more RBGs) of the physical resource blocks of the carrier component 660a-c.

In an aspect, resource manager 530 may control the allocation of virtual RB section 647a-d to physical RB section 667a-d of carrier components 660a-c. For example, resource manager 530 may physically allocate the data stored logically in virtual RB section 647a to physical RB section 667b in the physical RB associated with carrier component 660b. Similarly, virtual RB section 647b is also allocated to a physical RB section 667c in the physical RB associated with carrier component 660b. In an aspect, other virtual RB sections may be allocated to sections of carrier components 660a-c (e.g., virtual RB section 647c is allocated to physical RB section 667a, virtual RB section 647d is allocated to physical RB section 667d). In an aspect, carrier components 660a-c may concurrently transmit the contents of their respective physical resource blocks, including physical RB sections 667a-d.

In an aspect, the resource manager 530 may enable flexibility in the joint processing and optimization of encoding and interleaving data payload for multiple carrier components by using common source components (e.g., FEC encoders 542a-d, 642a-d, virtual RB 646) before splitting the data to be transmitted over the multiple carrier components. In an aspect, resource manager 530 can increase speed and reliability using multiple carrier components by using encoding and interleaving techniques to spread codeword instances over multiple carrier components that concurrently transmit (using methods like carrier aggregation) a source data payload.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. An apparatus for wireless communications using carrier aggregation comprising multiple carrier components, the apparatus comprising:
   a processor configured to generate one or more instances of a codeword from a payload;
   a resource manager configured to provide the processor with virtual carrier space comprising a logical carrier having a contiguous bandwidth equivalent to an aggregated bandwidth of the multiple carrier components, wherein the processor is further configured to map the one or more instances of the codeword to the logical carrier and the resource manager is further configured to map the one or more instances of the codeword from the logical carrier to the multiple carrier components for transmission; and
   a modulator configured to modulate the one or more instances of the codeword onto the multiple carrier components in accordance with the mapping by the resource manager.

2. The apparatus of claim 1, wherein the one or more instances of the codeword comprises multiple instances of the codeword, the resource manager being further configured to map each of the multiple instances of the codeword to a different one of the multiple carrier components.

3. The apparatus of claim 1, wherein the processor is further configured to interleave at least one of the instances of the codeword across the multiple carrier components, the resource manager being further configured to map each of the at least one instance of the codeword to the multiple carrier components in accordance with the interleaving by the processor.

4. The apparatus of claim 1, wherein the one or more instances of the codeword comprises multiple instances of the codeword, each of the multiple instances of the codeword being identical.

5. The apparatus of claim 1, wherein the one or more instances of the codeword comprises multiple instances of the codeword, each of the multiple instances of the codeword comprising different redundancy information associated with the payload.

6. An apparatus for wireless communications using carrier aggregation comprising multiple carrier components, the apparatus comprising:
- a processor configured to generate one or more instances of a codeword from a payload, the one or more instances of the codeword comprising one of multiple identical instances of the codeword or multiple instances of the codeword respectively having different redundancy information associated with the payload;
- a modulator configured to modulate the one or more instances of the codeword onto the multiple carrier components for transmission; and
- a resource manager configured to provide the processor with a virtual carrier space comprising a logical carrier having a contiguous bandwidth equivalent to an aggregated bandwidth of the multiple carrier components.

7. The apparatus of claim 6, the processor is further configured to map the one or more instances of the codeword to the logical carrier.

8. The apparatus of claim 7, wherein the resource manager is further configured to map the one or more instances of the codeword from the logical carrier to the multiple carrier components, the modulator being further configured to modulate the one or more instances of the codeword onto the multiple carrier components in accordance with the mapping.

9. A method of wireless communications using carrier aggregation comprising multiple carrier components, comprising:
- generating, by a processor, one or more instances of a codeword from a payload;
- modulating, by a modulator, the one or more instances of the codeword onto the multiple carrier components for transmission; and
- providing, to the processor by a resource manager, a virtual carrier space comprising a logical carrier having a contiguous bandwidth equivalent to an aggregated bandwidth of the multiple carrier components.

10. The method of claim 9, further comprising:
mapping, by the processor, the one or more instances of the codeword to the logical carrier.

11. The method of claim 10, further comprising:
mapping, by the resource manager, the one or more instances of the codeword from the logical carrier to the multiple carrier components,
wherein the one or more instances of the codeword are modulated onto the multiple carrier components in accordance with the mapping.

12. The method of claim 9, wherein the one or more instances of the codeword comprises multiple identical instances of the codeword.

13. The method of claim 9, wherein the one or more instances of the codeword comprises multiple instances of the codeword, each of the multiple instances of the codeword comprising different redundancy information associated with the payload.

14. A method of wireless communications using carrier aggregation comprising multiple carrier components, comprising:
- generating, by a processor, one or more instances of a codeword from a payload;
- providing, to the processor by a resource manager, a virtual carrier space comprising a logical carrier having a contiguous bandwidth equivalent to an aggregated bandwidth of the multiple carrier components;
- mapping, by the processor, the one or more instances of the codeword to the logical carrier;
- mapping, by the resource manager, the one or more instances of the codeword from the logical carrier to the multiple carrier components; and
- modulating, by a modulator, the one or more instances of the codeword onto the multiple carrier components in accordance with the mapping by the resource manager.

15. The method of claim 14, wherein the one or more instances of the codeword comprises multiple instances of the codeword, and
wherein the mapping of the one or more instances of the codeword from the logical carrier to the multiple carrier components comprises mapping each of the multiple instances of the codeword to a different one of the multiple carrier components.

16. The method of claim 14, further comprising:
interleaving, by the processor, at least one of the instances of the codeword across the multiple carrier components,
wherein the mapping of the one or more instances of the codeword from the logical carrier to the multiple carrier components is in accordance with the interleaving by the processor.

17. The apparatus of claim 14, wherein the one or more instances of the codeword comprises multiple instances of the codeword, each of the multiple instances of the codeword being identical.

18. The apparatus of claim 14, wherein the one or more instances of the codeword comprises multiple instances of the codeword, each of the multiple instances of the codeword comprising different redundancy information associated with the payload.

* * * * *